(12) United States Patent
Zhao et al.

(10) Patent No.: US 11,538,333 B2
(45) Date of Patent: Dec. 27, 2022

(54) DATA ACQUISITION CIRCUIT BOARD AND EQUIPMENT MONITORING SYSTEM

(71) Applicant: AUO MegaInsight (Suzhou) Co., Ltd., Suzhou (CN)

(72) Inventors: Lina Zhao, Suzhou (CN); Po Sun, Suzhou (CN); Zhao Guo, Suzhou (CN); Haiying Zhang, Suzhou (CN)

(73) Assignee: AUO MEGAINSIGHT (SUZHOU) CO., LTD., Suzhou (CN)

( * ) Notice: Subject to any disclaimer, the term of this patent is extended or adjusted under 35 U.S.C. 154(b) by 512 days.

(21) Appl. No.: 16/807,315

(22) Filed: Mar. 3, 2020

(65) Prior Publication Data

US 2020/0286367 A1    Sep. 10, 2020

(30) Foreign Application Priority Data

Mar. 7, 2019  (CN) .......................... 201920291578.5

(51) Int. Cl.
    *G06F 11/00*     (2006.01)
    *G08C 17/02*     (2006.01)
    *G01J 3/46*      (2006.01)

(52) U.S. Cl.
    CPC .............. *G08C 17/02* (2013.01); *G01J 3/46* (2013.01); *G08C 2201/10* (2013.01)

(58) Field of Classification Search
    CPC ........ G08C 17/02; G08C 2201/10; G01J 3/46

USPC ......................................................... 701/188
See application file for complete search history.

(56) References Cited

U.S. PATENT DOCUMENTS

| 8,397,988 | B1 * | 3/2013 | Zuili ..................... G06Q 20/409 235/383 |
| 2017/0288770 | A1 * | 10/2017 | Mentovich ............. H04B 10/40 |
| 2017/0346554 | A1 * | 11/2017 | Coli ...................... H04B 10/075 |
| 2020/0286367 | A1 * | 9/2020 | Zhao ........................ G08C 17/02 |
| 2020/0403457 | A1 * | 12/2020 | Nydell ................ H01L 31/0693 |

FOREIGN PATENT DOCUMENTS

| CN | 103905255 A | 7/2014 |
| CN | 206948382 U | 1/2018 |
| CN | 108566698 A | 9/2018 |

\* cited by examiner

*Primary Examiner* — Naomi J Small
(74) *Attorney, Agent, or Firm* — WPAT, PC

(57) ABSTRACT

A data acquisition circuit board and an equipment monitoring system are provided. The data acquisition circuit board includes a power supply module configured to perform voltage conversion and supply a power supply signal; a micro-processing unit coupled to the power supply module; a data acquisition module coupled to the micro-processing unit; and a data transmission unit coupled to the power supply module and the micro-processing unit; wherein the micro-processing unit receives and processes data acquired by the data acquisition module, and outputs processed results to the data transmission unit, which transmits the processed results wirelessly.

10 Claims, 7 Drawing Sheets

US 11,538,333 B2

DATA ACQUISITION CIRCUIT BOARD AND EQUIPMENT MONITORING SYSTEM

BACKGROUND OF THE INVENTION

1. Field of the Invention

The invention relates to a circuit board and an equipment monitoring system, and specifically to a data acquisition circuit board capable of monitoring the equipment in real time, and an equipment monitoring system applying the same.

2. Related Art

As for common large factories, many manufacturing equipment are distributed in different places, and each has three color (red, yellow, green) indicator lights and alarms. When the equipment works normally, the green indicator light is constantly on, and when the equipment has fault or is abnormal, the yellow light or the red light is constantly on or flickers. Since equipment is far away from each other, a large number of labors are required to monitor these equipment. When the equipment has fault or is abnormal, it is often found only from an alarm signal sent by the alarm to be heard, or change of state of the indicator lights to be seen by operators, which makes it impossible to treat fault or abnormity of the equipment timely. Moreover, data recording of the current equipment monitoring system mainly depends on manual recording of operators, such that the equipment cannot be monitored in real time, and working conditions of the equipment cannot be reflected accurately.

SUMMARY OF THE INVENTION

The technical problem to be solved by the invention is to provide a data acquisition circuit board, which can acquire states of the three color lights, and transmit the states to the equipment monitoring system in real time, so that operators monitor operating states of the equipment in real time, and also automatically request for repair service based on the states of the three color lights is realized via wireless connection between the equipment and mobile terminals through remote communication function.

To achieve the above object, the invention provides a data acquisition circuit board, comprising a power supply module configured to perform voltage conversion and supply a power supply signal, a micro-processing unit coupled to the power supply module, a data acquisition module coupled to the micro-processing unit, and a data transmission unit coupled to the power supply module and the micro-processing unit. Wherein the micro-processing unit receives and processes data acquired by the data acquisition module, and outputs processed results to the data transmission unit, which transmits the processed results wirelessly.

To achieve the above object, the invention further provides an equipment monitoring system, comprising a plurality of equipment to be monitored, each having any one of the data acquisition circuit board, a data transmission gateway coupled to the plurality of equipment to be monitored and configured to receive processed results transmitted from the data acquisition circuit board, a monitoring server coupled to the data transmission gateway, a monitoring host coupled to the monitoring server, and a monitoring terminal coupled to the monitoring host. Wherein the monitoring server receives the processed results transmitted from the data transmission gateway, and transmits the processed results to the monitoring terminal through the monitoring host.

By acquiring states of the three color lights with the data acquisition circuit board, and transmitting the states to the equipment monitoring system in real time, the invention has the advantageous effect that the operators can monitor operating states of the equipment in real time, and that automatically request for repair service based on the states of the three color lights is realized via wireless connection between the equipment and mobile terminals through remote communication function.

Hereinafter the invention is explicitly described with reference to the accompanying drawings and the detailed embodiments, but the invention is not limited thereto.

DETAILED EMBODIMENTS OF THE INVENTION

Figure 1:
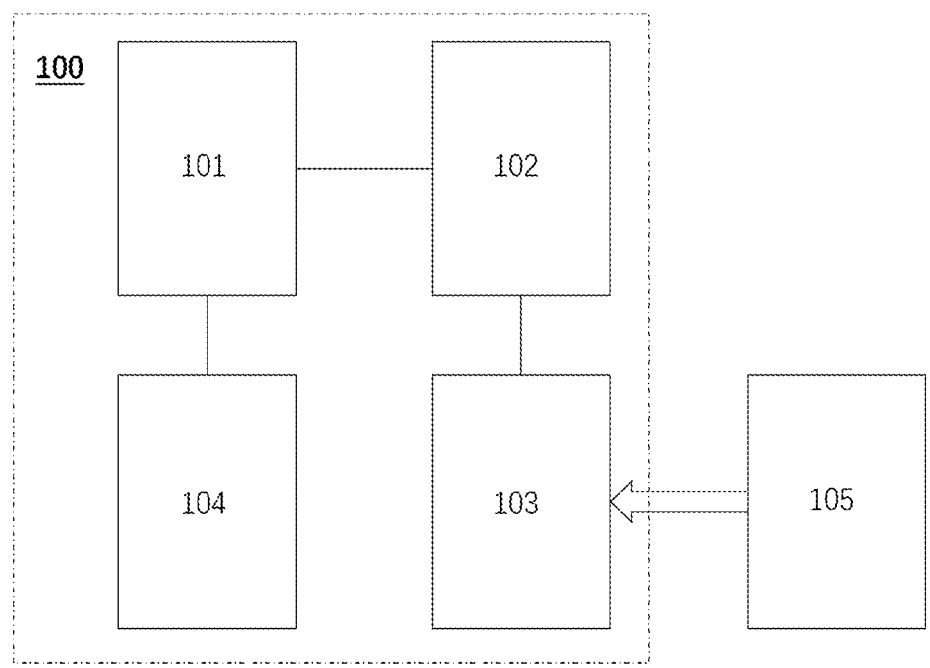
FIG. 1 is a circuit diagram of a data acquisition circuit board according to one embodiment of the invention.

Hereinafter structure principle and working principle of the invention are specifically described with reference to the accompanying drawings:

FIG. 1 is a circuit diagram of a data acquisition circuit board according to one embodiment of the invention. As shown in FIG. 1, the data acquisition circuit board 100 comprises a power supply module 101, a micro-processing unit 102, a data acquisition module 103 and a data transmission unit 104. The power supply module 101 is configured to convert voltage, and supply the converted voltage as a power supply signal to the micro-processing unit 102 and the data transmission unit 104.

In this embodiment, the data acquisition module 103 can acquire data of a plurality unit to be detected 105, and transmits the data to the micro-processing unit 102. The micro-processing unit 102 processes the data, and transmits processed results to the data transmission unit 104. Finally, the data transmission unit 104 wirelessly transmits the processed results.

Figure 2:
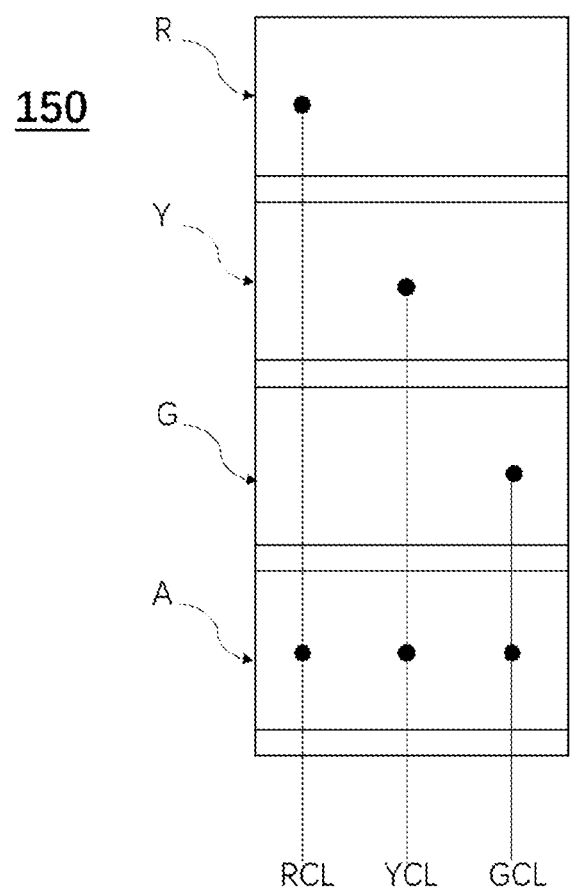
FIG. 2 is a structural diagram of a unit to be detected according to one embodiment of the invention.

FIG. 2 is a structural diagram of a unit to be detected according to one embodiment of the invention. As shown in FIGS. 1 and 2, the unit to be detected 105 may emit light having different wavelengths, respectively, such as, three color lights. In this embodiment, the three color lights comprise a red light R electrically connected to one end of a red light control line RCL, a yellow light Y electrically connected to one end of a yellow light control line YCL, and a green light G electrically connected to one end of a green light control line GCL, and the other ends of the red light control line RCL, the yellow light control line YCL and the green light control line GCL are connected to an alarm A and the data acquisition circuit board 100.

The data acquisition module 103 acquires data of the unit to be detected 105, such as, state data concerning ON or OFF of the lights, and transmits the state data to the micro-processing unit 102. The micro-processing unit 102 processes the state data, and transmits processed results to the data transmission unit 104. Finally, the data transmission unit 104 wirelessly transmits the processed results.

Figure 3:
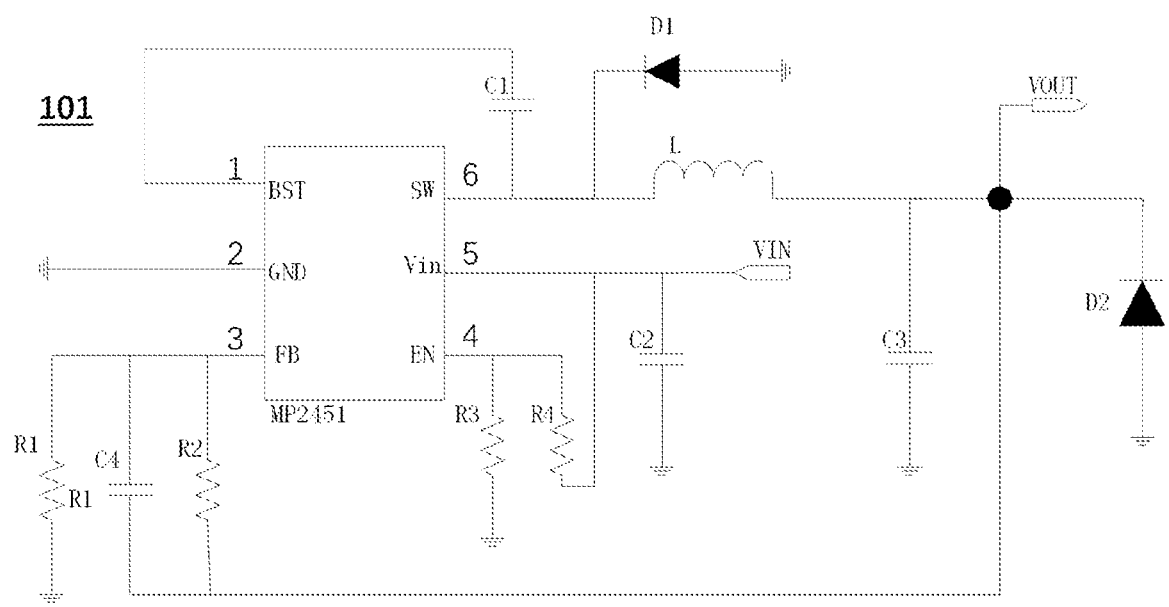
FIG. 3 is a circuit diagram of a power supply module according to one embodiment of the invention.

FIG. 3 is a circuit diagram of a power supply module according to one embodiment of the invention. As shown in FIG. 3, the power supply module 101 comprises a voltage conversion chip MP2451, resistors R1-R4, capacitors C1-C4, diodes D1-D2, an inductor L, a power input end VIN and a power output end VOUT, wherein the voltage conversion chip MP2451 comprises a first port BST coupled to a sixth port SW through the capacitor C1 with a capacitance of 100 µF; a second port GND grounded; a third port FB grounded through the resistor R1 with a resistance of 40.2 KΩ, and coupled to the power output end VOUT through the resistor R2 with a resistance of 24 KΩ and the capacitor C4 with a capacitance of 33 Pf connected in parallel; a fourth port EN grounded through the resistor R3 with a resistance of 10 KΩ, and coupled to a fifth port Vin through the resistor R4 with a resistance of 10 KΩ; the fifth port electrically connected to the power input end VIN, and grounded through the capacitor C2 with a capacitance of 4.7 µF; and the sixth port SW grounded through the diode D1, and coupled to the power output end VOUT through the inductor L with an inductance of 2.2 µH, and the power output end VOUT is grounded through the capacitor C3 with a capacitance of 10 µF and the diode D2, respectively. The power input end VIN inputs a high voltage signal, such as, 24 V, the power output end VOUT outputs a low voltage signal, such as, 3.3 V, and conversion from other high voltage signal (12 V) to other low voltage signal (1.8 V) can be realized by adjusting parameter values of resistance, capacitance or inductance.

Figure 4:
FIG. 4 is a circuit diagram of a micro-processing unit according to one embodiment of the invention.
Figure 5:
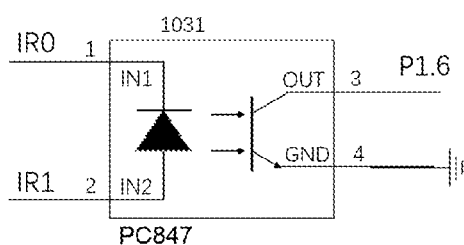
FIG. 5 is a circuit diagram of a data acquisition module according to one embodiment of the invention.
Figure 5:
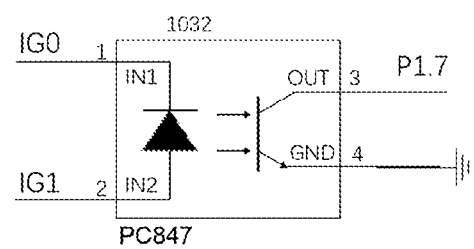
Figure 5:
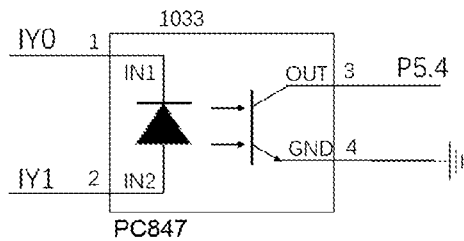
Figure 5:
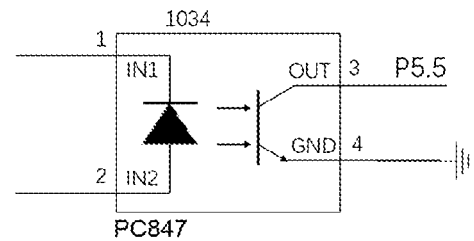
Figure 6:
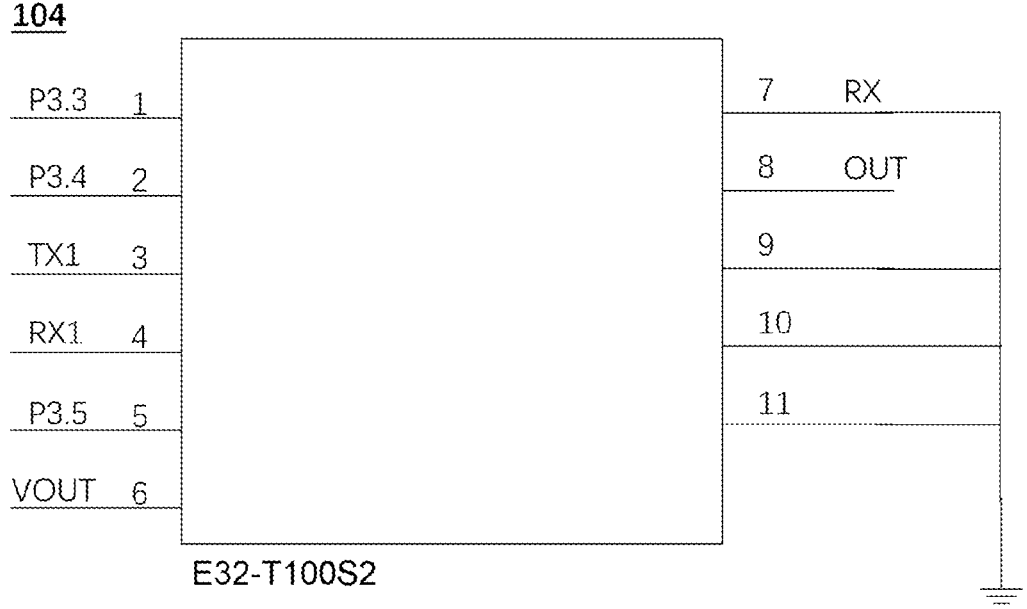
FIG. 6 is a circuit diagram of a data transmission unit according to one embodiment of the invention.

FIG. 4 is a circuit diagram of a micro-processing unit according to one embodiment of the invention, FIG. 5 is a circuit diagram of a data acquisition module according to one embodiment of the invention, and FIG. 6 is a circuit diagram of a data transmission unit according to one embodiment of the invention. As shown in FIGS. 3-6, the micro-processing unit 102, for example, is formed of a single chip STC8F2K64S2, the data acquisition module 103 is formed of data acquisition units 1031, 1032, 1033 and 1034, the data acquisition units 1031, 1032, 1033 and 1034, for example, are formed of a photoelectric coupling chip PC847, and the data transmission unit 104, for example, is formed of a remote communication (Lora) chip E32-T100S2.

Specifically, a port P1.0 of the chip STC8F2K64S2 is coupled to a port TXD of the chip E32-T100S2 through a signal line RX1, a port P1.1 of the chip STC8F2K64S2 is coupled to a port RXD of the E32-T100S2 through a signal line TX1, a port P1.6 of the chip STC8F2K64S2 is coupled to a port OUT of the data acquisition unit 1031 through a signal line P1.6, a port P1.7 of the chip STC8F2K64S2 is coupled to a port OUT of the data acquisition unit 1032 through a signal line P1.7, a port P5.4 of the chip STC8F2K64S2 is coupled to a port OUT of the data acquisition unit 1033 through a signal line P5.4, a port VCC of the chip STC8F2K64S2 is electrically connected to the power output end VOUT of the power supply module 101, a port P5.5 of the chip STC8F2K64S2 is coupled to a port OUT of the data acquisition unit 1034 through a signal line P5.5, a port GND of the chip STC8F2K64S2 is grounded, a port P3.3 of the chip STC8F2K64S2 is coupled to a port M0 of the chip E32-T100S2 through a signal line P3.3, a port P3.4 of the chip STC8F2K64S2 is coupled to a port M1 of the chip E32-T100S2 through a signal line P3.4, a port P3.5 of the chip STC8F2K64S2 is coupled to a port AUX of the chip E32-T100S2 through a signal line P3.5, and ports 3.0, 3.1, 3.6 and 3.7 of the chip STC8F2K64S2 are connected to control signals RXD, TXD, TX and RX, respectively.

Further, as shown in FIG. 5, the data acquisition unit 1031 has a port IN1 electrically connected to a first control signal of the red light R in the three color lights through a signal line IR0, a port IN2 electrically connected to a second control signal of the red light R through a signal line IR1, and the port GND grounded. The data acquisition unit 1032 has a port IN1 electrically connected to a first control signal of the green light G in the three color lights through a signal line IG0, a port IN2 electrically connected to a second control signal of the green light G through a signal line IG1, and the port GND grounded. The data acquisition unit 1033 has a port IN1 electrically connected to a first control signal of the yellow light Y in the three color lights through a signal line IY0, a port IN2 electrically connected to a second control signal of the yellow light Y through a signal line IY1, and the port GND grounded. The data acquisition unit 1034 serves as a backup, and when it requires acquiring data of state of other indicator lights or alarms, connection manners of ports IN1, IN2 are the same as that of other data acquisition units. The data acquisition units 1031, 1032 and 1033 acquire state data of the three color lights based on the first control signals and the second control signals of the three color lights in real time, and transmit the state data to the micro-processing unit 102. The micro-processing unit 102 processes the received state data, and transmits processed results to the data transmission unit 104. Specifically, when the equipment works normally, for example, the green light G is constantly on, the red light R and the yellow light Y are off, and the state data are processed by the micro-processing unit 102 to generate a normal signal indicating that the equipment works normally. When the equipment works abnormally or has fault, the red light R and/or the yellow light Y are (is) on or flicker(s), and the state data are processed by the micro-processing unit 102 to generate an alarm signal indicating that the equipment works abnormally. The micro-processing unit 102 transmits the normal signal and/or the alarm signal indicating operating states of the equipment to the data transmission unit 104.

Further, as shown in FIG. 6, the chip E32-T100S2 has a port VCC electrically connected to the power output end VOUT of the power supply module 101, a port GND connected in parallel and grounded, and a port ANT for wirelessly transmitting the processed results of the micro-processing unit 102, i.e., the normal signal and/or the alarm signal.

Figure 7:
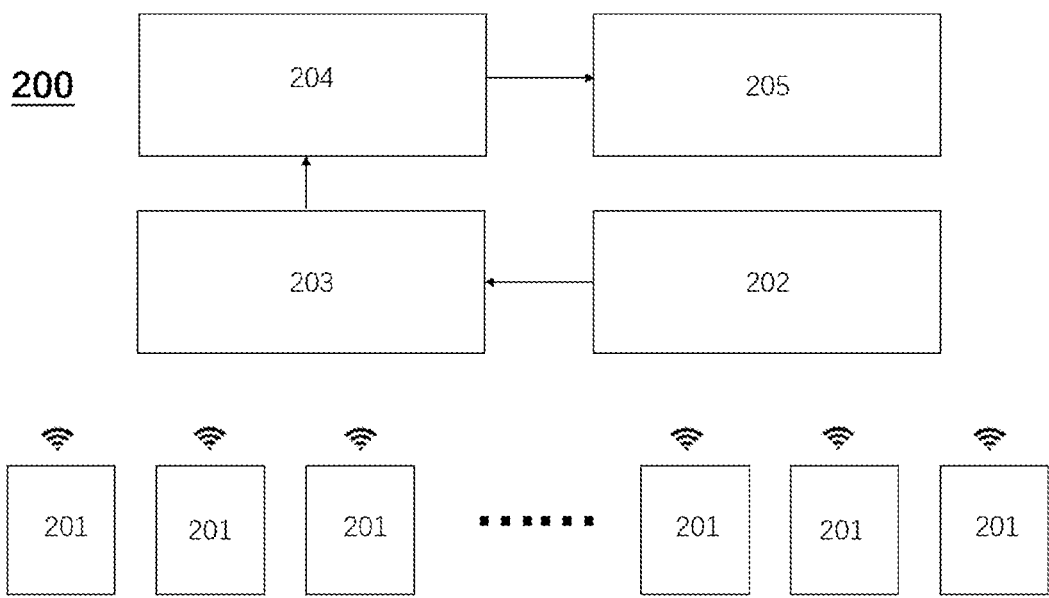
FIG. 7 is a structural diagram of an equipment monitoring system according to one embodiment of the invention.

FIG. 7 is a structural diagram of an equipment monitoring system according to one embodiment of the invention. As shown in FIG. 7, the equipment monitoring system 200 comprises a plurality of equipment to be monitored 201, a data transmission gateway 202, a monitoring server 203, a monitoring host 204, and a monitoring terminal 205. Specifically, each of the plurality of equipment to be monitored 201 is mounted with the data acquisition circuit board 100, the data transmission gateway 202 is coupled to the equipment to be monitored 201 wirelessly and configured to receive processed results transmitted from the data acquisition circuit board 100, the monitoring server 203 is coupled to the data transmission gateway 202, the monitoring host 204 is coupled to the monitoring server 203, and the monitoring terminal 205 is coupled to the monitoring host 204. The data transmission gateway 202 can transmit the processed results to the monitoring server 203, the monitoring host, and then the monitoring terminal 205 through wired and/or wireless connection. The data transmission gateway 202, the monitoring server 203, the monitoring host 204 and the monitoring terminal 205 may be one or more, but the invention is not limited thereto. The monitoring terminal 205 can use mobile terminals, such as, smart phones, PADs, and the like. In the case where equipment to be monitored are few, the processed results also can be directly sent to the monitoring terminal through the data acquisition circuit board.

By using the equipment monitoring system of the invention, the equipment can be monitored in real time and automatically request for repair service is also realized via wireless connection between the equipment and mobile terminals through remote communication function.

Of course, the invention also may have various other embodiments, and those skilled in the art shall make various corresponding modifications and variations without departing from spirit and essence of the invention, but these corresponding modifications and variations shall belong to the scope protected by the appended claims of the invention.

What is claimed is:

1. A data acquisition circuit board, comprising:
a power supply module configured to perform voltage conversion and supply a power supply signal;
a micro-processing unit coupled to the power supply module;
a data acquisition module coupled to the micro-processing unit; and
a data transmission unit coupled to the power supply module and the micro-processing unit;
wherein the micro-processing unit receives and processes data acquired by the data acquisition module, and outputs processed results to the data transmission unit, which transmits the processed results wirelessly;
wherein the power supply module comprises a voltage conversion chip, a first resistor, a second resistor, a third resistor, a fourth resistor, a first capacitor, a second capacitor, a third capacitor, a fourth capacitor, a first diode, a second diode, an inductor, a power input end and a power output end, wherein the voltage conversion chip comprises a first port, a second port, a third port, a fourth port, a fifth port and a sixth port, wherein the first port is coupled to the sixth port through the first capacitor, the second port is grounded, the third port is grounded through the first resistor and coupled to the output end through the second resistor and the fourth capacitor connected in parallel, the fourth Port is grounded through the third resistor and coupled to the fifth port through the fourth resistor, the fifth port is electrically connected to the power input end and grounded through the second capacitor, and the sixth port is grounded through the first diode and coupled to the power output end through the inductor, and wherein the power output end is grounded through the third capacitor and the second diode, respectively.

2. The data acquisition circuit board according to claim 1, wherein the data acquisition module comprises a plurality of data acquisition units for acquiring data of a plurality of units to be detected in one-to-one correspondence.

3. The data acquisition circuit board according to claim 2, wherein each of the data acquisition units comprises a first input end, a second input end, an output end and a ground end; the first input end and the second input end supply a first input signal and a second input signal, respectively, and the data acquisition unit acquires data of the first input signal and the second input signal, and generates an output signal transmitted to the micro-processing unit through the output end.

4. The data acquisition circuit board according to claim 3, wherein the data acquisition units are optoelectronic coupling devices.

5. The data acquisition circuit board according to claim 1, wherein the data transmission unit is a WiFi module, a GPRS module, a Bluetooth module or a Lora module.

6. The data acquisition circuit board according to claim 1, wherein the power input end of the power supply module is configured to input a first voltage, and the power output end of the power supply module is configured to output a second voltage.

7. The data acquisition circuit board according to claim 6, wherein the first voltage is 24 V, and the second voltage is 3.3 V.

8. He data acquisition circuit board according to claim 2, wherein the plurality of units to be detected are configured to emit light having different wavelengths, respectively.

9. An equipment monitoring system, comprising:
a plurality of equipment to be monitored, each having the data acquisition circuit board according to claim 8;
a data transmission gateway coupled to the plurality of equipment to be monitored and configured to receive processed results transmitted from the data acquisition circuit board;
a monitoring server coupled to the data transmission gateway;
a monitoring host coupled to the monitoring server; and
a monitoring terminal coupled to the monitoring host;
wherein the monitoring server receives the processed results transmitted from the data transmission gateway, and transmits the processed results to the monitoring terminal through the monitoring host.

10. The equipment monitoring system according to claim 9, wherein the numbers of the data transmission gateway, the monitoring server, the monitoring host and the monitoring terminal may be one or more.

* * * * *